Jan. 21, 1936.　　　H. C. LORD　　　2,028,551
MOUNTING AND JOINTS THEREFOR
Filed Dec. 5, 1933　　　3 Sheets-Sheet 2
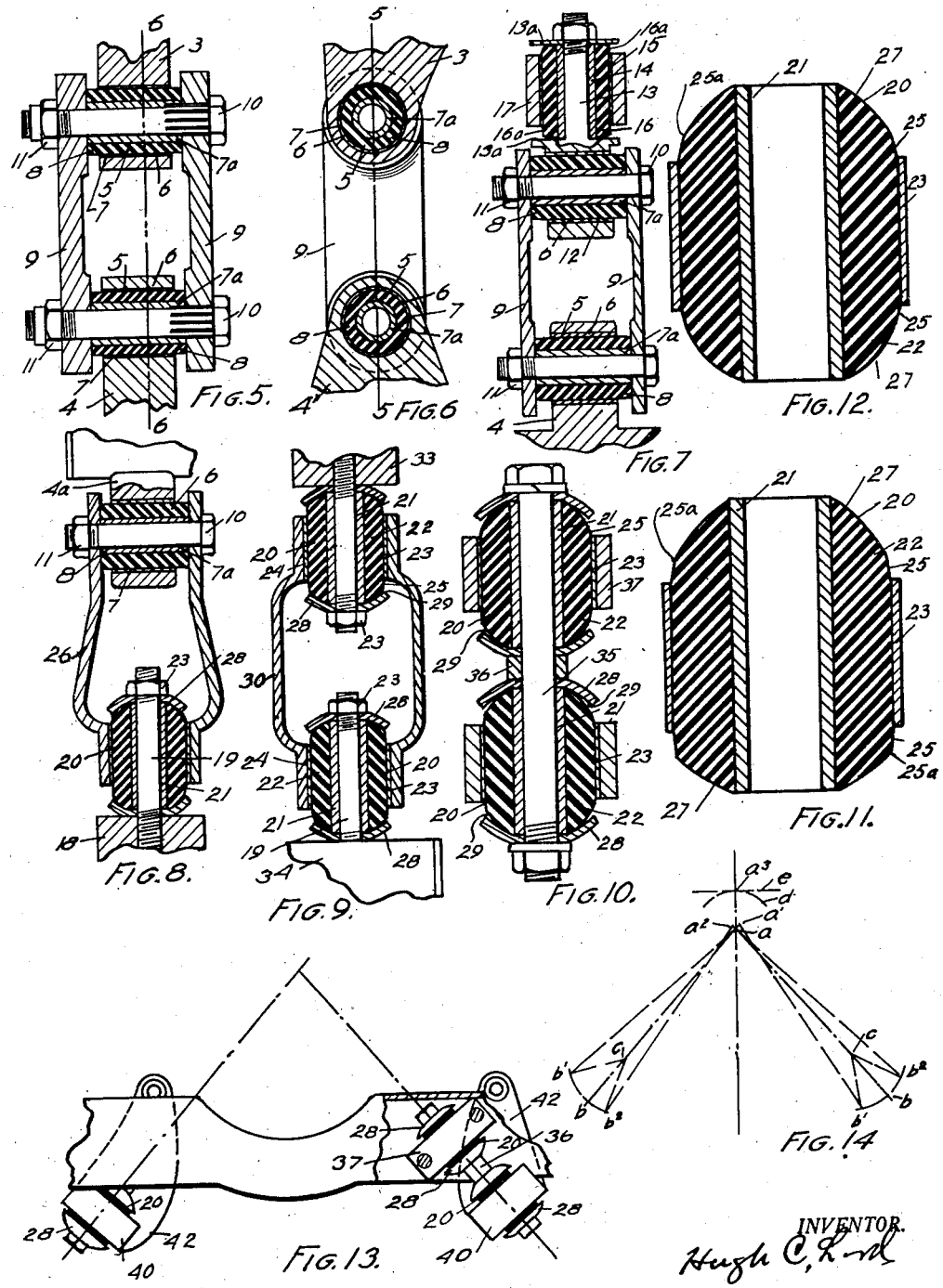
INVENTOR.
Hugh C. Lord Jan. 21, 1936.　　　　H. C. LORD　　　　2,028,551
MOUNTING AND JOINTS THEREFOR
Filed Dec. 5, 1933　　　3 Sheets-Sheet 3
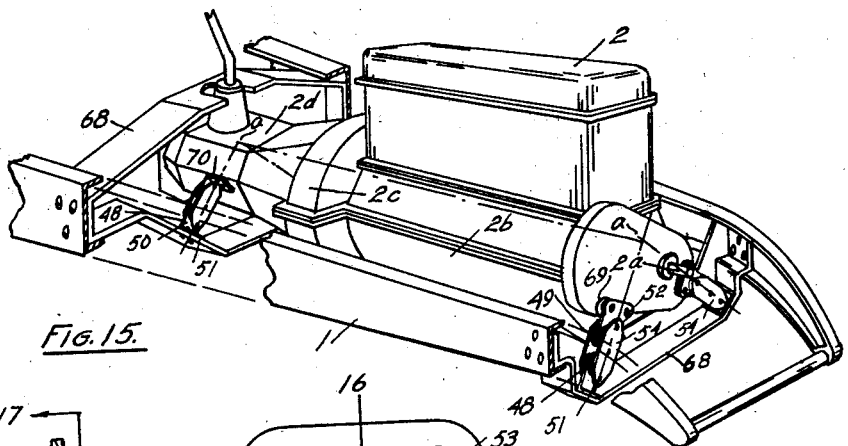
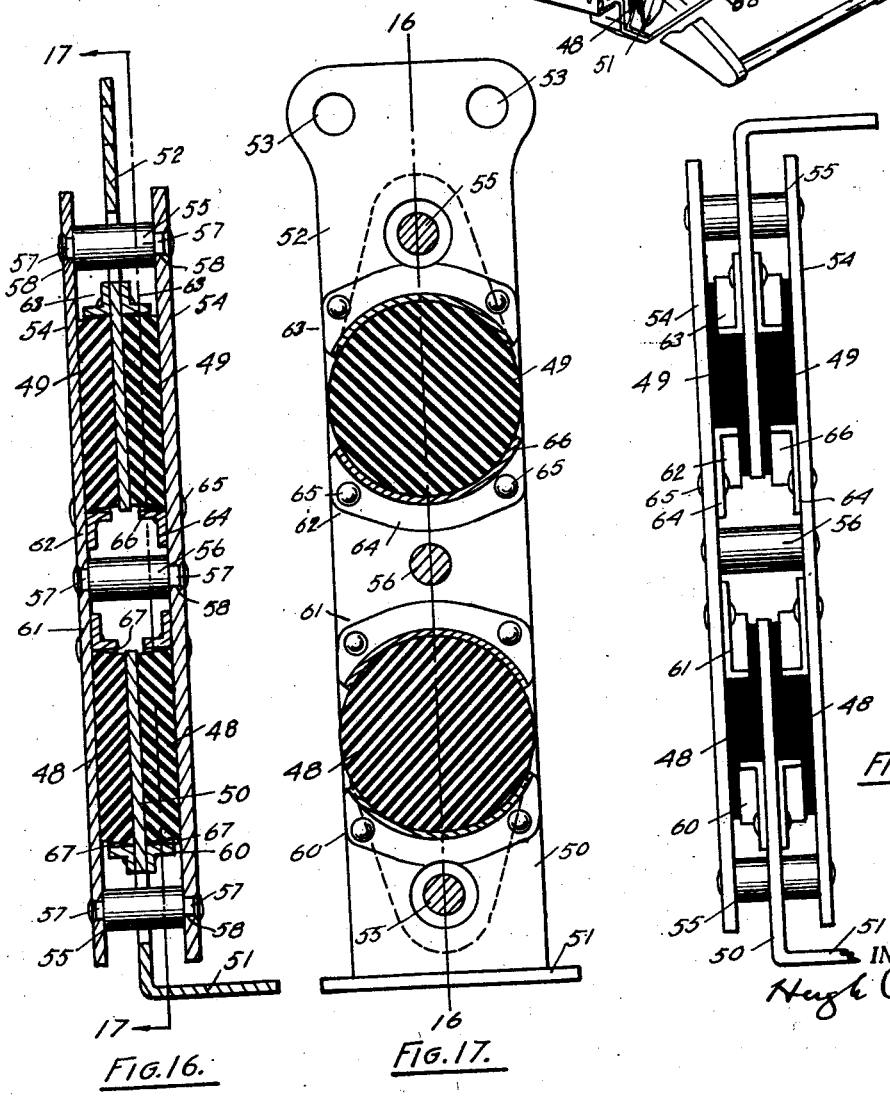
INVENTOR.
Hugh C. Lord Patented Jan. 21, 1936

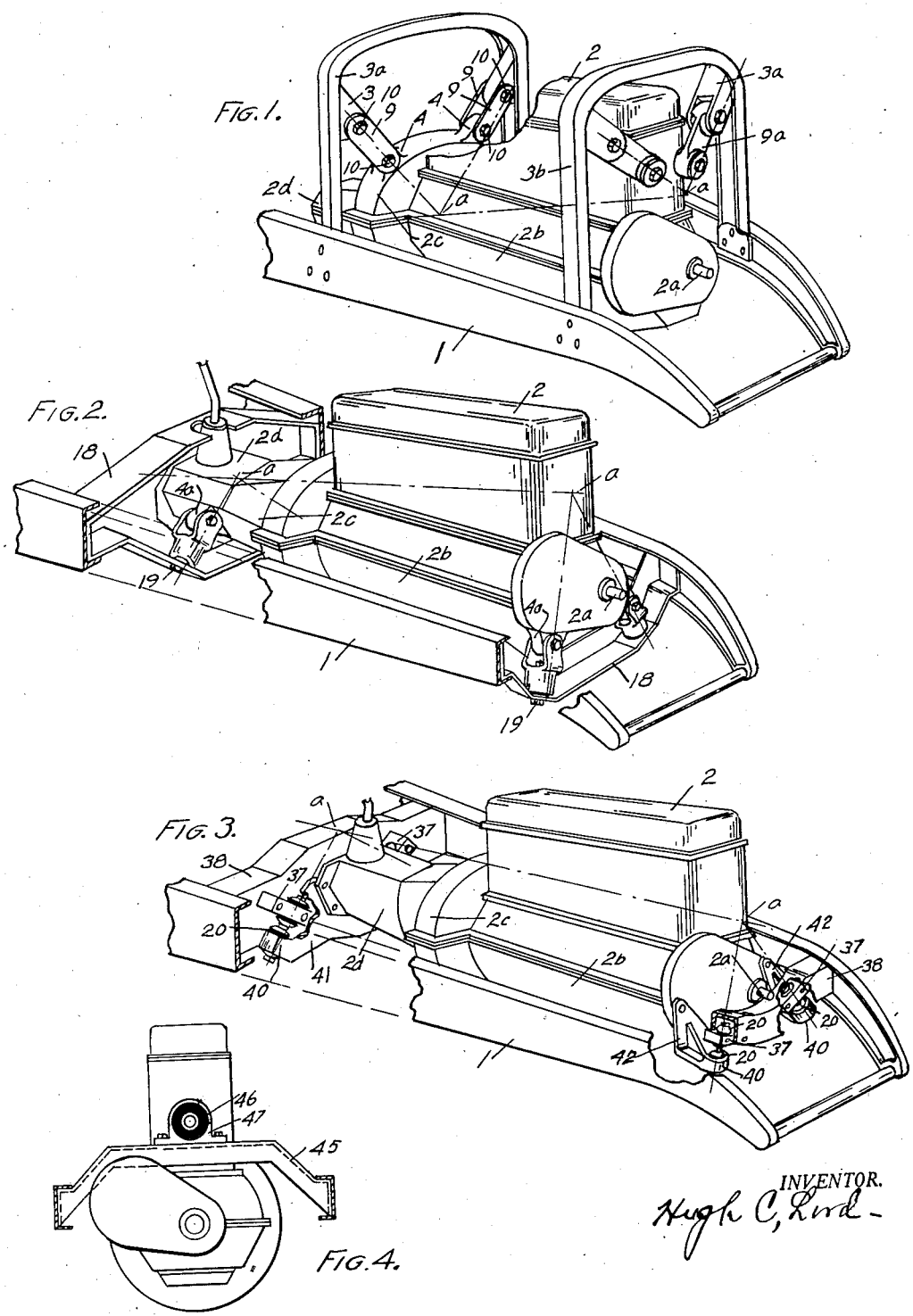

2,028,551

UNITED STATES PATENT OFFICE 2,028,551

MOUNTING AND JOINTS THEREFOR

Hugh C. Lord, Erie, Pa.

Application December 5, 1933, Serial No. 701,064

24 Claims. (Cl. 248—7)

The present invention is designed to provide a mounting for vibrating instruments. It is particularly effective for instruments having torque impulses such, for example, as an automobile engine and as exemplified it is shown as applied to an automobile. In very many environments, such as an automobile, the communication of such vibrations is very objectionable. Instruments having torque impulses usually have vibrations other than those torque-induced, such as induced by unbalanced conditions, or reciprocating parts. In the present invention provision is made, particularly in the more preferred forms for accommodating all vibrations. In carrying out the invention I mount the instrument, as an engine, through preferably cushioned swinging supports which through their arrangement permit of oscillation about an axis defined by the arrangement of the supports. Features and details of the invention will appear from the specification and claims.

A preferred embodiment of the invention is illustrated in the accompanying drawings as follows:—

Fig. 1 shows a perspective view of an automobile engine mounted with links in tension from above and with the free ends of the links the nearer ends to the oscillating center.

Fig. 2 a similar view with the links arranged in compression and from below.

Fig. 3 a similar view of an engine with the links arranged in tension and at the bottom and with their swinging ends away from the oscillating center.

Fig. 4 an end view of an engine involving a single pivotal joint for one end of the engine.

Fig. 5 a section on the line 5—5 in Fig. 6 of a link structure having radially cushioned pivots.

Fig. 6 a section on the line 6—6 in Fig. 5.

Fig. 7 a sectional view showing a shear mounting for one of the radial cushions of the link structure shown in Figs. 5 and 6.

Fig. 8 a sectional view of a linkage having a radial cushioned pivot at one end and a shear cushioned pivot at the opposite end.

Fig. 9 a view in which the shear cushioned pivots are arranged at both ends of the link.

Fig. 10 a modified form of link with shear cushions at both ends.

Fig. 11 a sectional view of a shear cushion with the rubber unstressed.

Fig. 12 a similar view with the cushion under normal load.

Fig. 13 a detached view of the link connection shown in Fig. 3.

Fig. 14 a diagram indicating one of the link movements, as in Figs. 2 and 13.

Fig. 15 a perspective view of an engine with a modified link mounting.

Fig. 16 an enlarged view of the link structure shown in Fig. 15 in section on the line 16—16 in Fig. 17.

Fig. 17 a section on the line 17—17 in Fig. 16.

Fig. 18 a side elevation of a link.

1 marks the frame of the automobile and 2 the engine. As shown the engine indicates a multi-cylinder engine with the cylinders arranged in line. The engine has the usual crank shaft 2a and as shown is provided with a crank case 2b, clutch housing 2c and transmission 2d. The invention, however, is not limited in its broader phases to engines.

In the construction shown in Fig. 1, frame brackets 3 are mounted on cross members 3a and 3b, these extending with U-shape upwardly from the main fame 1. Brackets 4 are secured to the engine, as shown to the bell housing at the rear and to the front of the cylinders at the front. The link structure shown in Figs. 5 and 6 is utilized at the rear of the engine and this involves the radial cushions 5, each cushion being arranged in openings 6 in the brackets. Each radial cushion has an outer shell 7, an inner sleeve 7a and a rubber bushing 8 bridging the space between the shell and sleeve, said bushing being preferably bonded during vulcanization to the shell and sleeve. With such bonding the shrinkage of the rubber after vulcanization puts the rubber under definite initial tension. The shells form a pressed fit in the opening 6. Links or connectors 9 are arranged at each end of the sleeves 7a and locked therewith by clamping bolts 10 provided with clamping nuts 11. A similar structure is shown at the front end except that links 9a receive the sleeves 7 of the radial joints and the brackets engage the ends of the sleeve 7a. The links or connectors converge and lines through the pivots of the links intersect at a—a and the engine will rock about an axis following the points of intersection a—a. As hereinafter more definitely indicated the axis is not exactly stationary, but it can be placed, by changing the inclination of the links and their attachment to the engine, practically at any point desired. As shown in Fig. 1 the axis of oscillation is inclined, but while this may be desirable in some cases this is not essential. Further the axis may at one position be through the center of the mass, but this may be quite definitely departed from with satisfactory results, one of the desirable features of the invention being that the axis may be conveniently placed as desired. The rubber bushings yieldingly resist the swinging action of the links and consequently the torque impulses of the engine. These may be made readily sufficient to resist the torque thrust. With the rubber bonded to the sleeve and shell and the rubber in tension the normal load is largely carried by the tension side of the joint and thus vibrations accommodated by the radial movement of the cushions are more sensitively taken care of than with rubber definitely compressed.

If desired, one at least of the links having radial cushions may be provided with a mounting having the rubber disposed to accommodate the load in shear. Such an arrangement is shown in Fig. 7. An eye 12 receives the shell of one of the radial mountings. This eye has a stud 13 extending therefrom. The stud extends through a sleeve 14 of a shear mounting having an outer shell 15 and a wall of rubber 16, the wall of rubber being preferably bonded during vulcanization to the sleeve and shell and, therefore, placed under initial tension. The shell is pressed into a bracket 17 carried by the engine frame. The ends of the rubber are extended at 16a and these extensions have bottoming faces arranged with relation to bottoming plates 13a. By shaping these end faces, preferably slightly inclined when under load, the free shear action of the rubber is modified so as to give comparatively free action in the vibration range and a definite increase against movement beyond the vibration range. It will be understood that rubber in shear while giving definite stability is very much softer and affords a lower vibration period than the same rubber under other stresses and is, therefore, better adapted to dampen vibration.

In the structure shown in Fig. 2, the engine frame is provided with cross members 18. The link or connector of the linkage involved in this structure is shown specifically in Fig. 8. The upper end has the radial cushions 6 which are secured in the engine brackets 4a. The joint at the lower end of the mounting is provided with a stud 19 which is secured to the cross member 18. A shear mounting 20 has a sleeve 21, a rubber bushing or wall 22 and a shell 23, these being bonded together during vulcanization, are under initial tension. The shell is pressed into a sleeve 24 formed at the ends of links 26. The links 26 are secured to the sleeve 7a of the radial cushion by the radial cushion bolts 10. The bushings have rubber extensions 25 being slightly conical to points 25a Figs. 11 and 12. The balance of the extensions 27 is dome-shaped and dome-shaped snubber plates 28 are arranged on the stud 19 and clamped on the sleeve 21 by the nut 23. The dome-shaped snubbing plate 28 may provide a slight space 29 between the face 27 and the plate 28, or may just touch. The structure modifies the shear action giving a comparatively free shear action in the vibration range and a more or less quick snubbing action beyond that range. The space 29 as shown is somewhat exaggerated over what is usually desirable. The joint 20 responds to the swinging action of the link by rocking motion of the mounting 20 crosswise of its axis. The dome-shaped ends approximately follow the arc of rocking movement. Preferably they are centered slightly closer to the ends of the joint than the rocking center as this tends to maintain clearance with relation to the bulging of the rubber as the joint is rocked on the sleeve. The joint 20 not only responds to the swinging of the link movement to accommodate torque pulsations, but it is very sensitive to other vibrations such as are induced by unbalanced conditions and reciprocating parts in that the movement endwise of the link through this joint results in a shear action on the rubber which is extremely sensitive and of very low period.

It will be noted that the linkage as shown in Fig. 2 is more universal in its application and more sensitive than that shown in Fig. 1. It differs also from that shown in Fig. 1 in that the links in the structure of Fig. 2 are under compression while those in Fig. 1 are under tension. The swinging action of the links in Fig. 1 tends to raise the engine as it rocks from its central position so that there is a tendency irrespective of the resistance of the rubber for the engine to return to its central position whereas in the linkage as shown in Fig. 2 the engine is lowered slightly as it swings from its center and is unstable as to gravity forces, but is yieldingly maintained at its central position through the resistance of the rubber.

In Fig. 3 a tension linkage is shown in which both ends of the linkage are provided with shear cushions 20. The detail structure of a link is shown with slight modifications in Figs. 9 and 10.

In Fig. 9 the mountings 20 are secured to frame supports 33 and engine supports 34 by studs 19 similar to those shown in Fig. 8 and these are connected by the links 30. The joints operate in the manner of the single joint 20 in Fig. 8.

In the modification shown in Fig. 10 brackets 37 are carried on cross members 38 of the frame and the upper mounting 20 has its shell 23 secured in said bracket. The lower mounting is secured in brackets 40 in a yoke 41 at the rear of the engine and a yoke 42 at the front of the engine. The upper and lower mountings are connected by a bolt 35 which extends through the central sleeves and the mountings are spaced as desired by a spacer bushing 36. This double shear mounting gives double softness and consequently a very low period with the same strength as where but one shear joint is used. The joints respond to torque impulses by a cross rocking of its shell and sleeve in conjunction with a yielding shear. It responds to any thrust vibrations having movement lengthwise of the links by a movement in shear of both of its joints and it responds to any vibration sidewise of the links by a wobbling action of one joint relatively to the other giving a universal response to vibrations in any direction, thus giving a supersensitive mounting and through the snubbing ends and pressure built up by the rocking action limits the sensitive range within workable limits. In this structure the dome-shaped ends accommodate the rocking action of the snubbing plates with relation to the snubbing surfaces of the rubber in the manner described as to the mounting 20 in Fig. 8.

In Fig. 3 it will be noted that the swinging pivot of the link is remote from the oscillating center of the engine. This is indicated in detail in Fig. 13 and the link action is diagrammed in Fig. 14. The swinging pivot of the link in its central position is shown at $b$ and the stationary pivot of the link at $c$. The swinging arc of the pivot $b$ has its extremes at $b'$ and $b^2$, this being a longer arc than normally encountered in practice, but it will be noted that the greater portion of the arc is toward $b'$ in the direction of torque thrust. The oscillating center with the parts in the central position is at $a$. As the point $b$ swings for instance to $b'$ the shorter radius afforded by the link $c$ $b'$ than would be involved if there were a direct movement around the pivot $a$ carries the point $a$ upwardly and to the right, as shown at $a'$ and the reverse movement with the swinging ends of the links at $b^2$ brings the intersection of the links at $a^2$. Thus it will be noted that the engine is lifted slightly as it swings from its central position and tends to return to that position through gravity forces. It will be observed also that where the links have their swinging pivots more remote from the oscillating center the pivotal action at the swinging end of the link is much less than where the links are arranged in the opposite direction and while a greater movement is desirable with the radially arranged joints, as in Fig. 1, in order that more resistance to torque impulses may be interposed a reduced movement is desirable with a shear joint and consequently the swinging pivot away from the oscillating center is particularly advantageous with the shear joint. Further with such an arrangement of the link the movement of the oscillating center from a true center is less than where the swinging end of the link is toward the rocking center.

It will be noted also that if the center of the mass, as for instance $a^3$ Fig. 14, of the oscillating instrument is placed above the intersection at $a$ the mass would have a downward movement if the oscillating movement were about a fixed center at $a$, as indicated by the arc $d$, but in as much as the center $a$ raises with the oscillation the path traversed by the center $a^3$ may be made more nearly horizontal, or straight line, as shown at $e$, in fact, may be placed so as to practically follow a straight horizontal path. Thus while this center of the mass may be given a slight sidewise movement by being arranged away from the focal center of the links it may be maintained at more nearly the same vertical position than if placed directly at the focal center. In many installations this variation is desirable.

In some situations it may be desirable to use the links as the support at one end of the engine and a single cushion pivotal joint at the opposite end. Such a structure is indicated in Fig. 4 in which a cross member 45 is shown at the front of the engine. A radial joint 46, similar to the radial joint 5, is secured in a bracket 47 on the cross piece and arranged with its axis on the desired center of oscillation.

In some installations it may be desirable to carry the instrument in shear and provide for a free rocking through torque impulses but prevent to a large extent endwise freedom of the instrument. This may be accomplished by the link system shown in Figs. 15 to 18. The links involve joint units having rubber discs 48 in the lower joint and rubber discs 49 in the upper joint. The discs of the lower joint are vulcanized onto each side of a center plate 50 having a bracket foot 51 by means of which the lower end of the link may be secured. The upper discs 49 are vulcanized onto opposite sides of a plate 52 having perforations 53 by means of which it may be secured to the engine. Outer plates 54 are arranged each side of the plate 50 and the rubber discs are vulcanized to these plates. The plates 54 are spaced apart and secured together by pins 55 at the ends and a central pin 56, each pin having an extension 57 at each end extending through an opening 58 in each of the plates and each pin providing a shoulder spacing the plates 54 apart. The extensions are headed over to secure the plates, but one of the extensions at least telescopes the opening during the vulcanizing operation so that a pressure relation may be established between the rubber and the plates during the vulcanization and the shrinkage of the rubber is resisted by the pins so as to place the discs under initial tension. Snubbing plates 60 are arranged at the bottom of the disc 48 on the plate 50. Snubbing plates 61 are arranged on the inner surfaces of the plate 54 at the upper ends of the discs 48. Snubbing plates 62 are secured to the inner surfaces of the plates 54 and arranged at the bottom of the discs 49 and snubber plates 63 are secured to the plate 52 above the disc 49. These plates are each provided with a base 64 and are secured by rivets 65 extending through the base and each has a shoulder flange 66. The rubber is preferably slightly spaced from the flange 66 under normal load at 67 so that there is a free shear movement through the ordinary vibratory range and this is modified by these snubbing plates beyond that range. The bases 51 are secured to cross members 68 of the frame and the plates 52 are secured to engine brackets 69 and 70.

In operation the links rock on a center of the disc. The rubber of the discs yields in circumferentially directioned shear. The discs also respond to endwise movement of the links in shear, but oppose endwise movement of the engine, or fore and aft movement of the links by direct stress of the rubber. It will be noted that the snubbing plates are so arranged that if there is a complete severance of the rubber from the plates the rubber will be included in pressure relation between the snubbing plates so as to support the engine in the event of such a failure. It will be understood that these plates may be arranged in the different relations previously described, that is, in tension, or compression, or above, or below the engine and that they provide a focal center in the same manner as the preceding joints.

It will be understood that any of the cushions illustrated may be used at one end of the link in connection with any of the cushions illustrated at the opposite end of the link, or that any of the cushions may be used with the links arranged in tension, or compression and with the links arranged above, or below, the engine, or instrument, and that, under certain arrangements, the instrument may be carried by one pair of links, or the links may be arranged as shown herein axially spaced along the instrument. The links may be used at one end in connection with other types of joints for the opposite end of the instrument, as for instance, in Fig. 4. Thus not only is the structure functionally advantageous, but it is also advantageous by reason of the convenience, or ease, with which it may be adapted to almost any condition.

What I claim as new is:—

1. A mounting between a unit having oscillatory vibration about an axis and a support including inclined converging swinging connectors between the unit and support, said connectors being provided at least at one of the ends thereof with pivotal rubber cushions so constructed and arranged as to respond to endwise thrusts on the connectors through shear stress of the rubber and presenting an arcuate surface in the direction of thrust and a curved snubbing means having a surface opposing the arcuate end, said curved and arcuate surfaces centering in the direction of the rocking centers of the cushions and limiting the shear movement of the cushions.

2. A mounting between a unit having oscillatory vibration about an axis and a support including inclined converging swinging connectors between the unit and support, said connectors being provided at least at one of the ends thereof with pivotal rubber cushions so constructed and arranged as to respond to endwise thrusts on the connectors through shear stress of the rubber and presenting an arcuate surface at both ends in the direction of thrust and curved snubbing means at each end of the cushions having surfaces opposing the arcuate ends, said curved and arcuate surfaces centering in the direction of the rocking centers of the cushions and limiting the shear movement of the cushions.

3. A mounting between a unit having oscillatory vibration about an axis and a support including inclined converging swinging connectors between the unit and support, said connectors being provided at each end with pivotal rubber cushions so constructed and arranged as to respond to endwise thrusts on the connectors in shear stress of the rubber and presenting an arcuate surface in the direction of thrust and a curved snubbing means having a surface opposing the arcuate end, said curved and arcuate surfaces centering in the direction of the rocking centers of the cushions and limiting the shear movement of the cushions.

4. A mounting between a unit having oscillatory vibration about an axis and a support including inclined converging swinging connectors between the unit and support, said connectors being provided at least at one of the ends thereof with pivotal rubber cushions comprising a tubular outer member, an inner member, and a rubber element bridging the space between the inner and outer members and being in non-slip relation to said members, said element being so constructed and arranged as to respond to endwise thrusts on the connectors in shear stress of the rubber and presenting an arcuate surface in the direction of thrust and a curved snubbing means having a surface opposing the arcuate end, said curved and arcuate surfaces centering in the direction of the rocking centers of the cushions and limiting the shear movement of the cushions.

5. A mounting between a unit having oscillatory vibration abut an axis and a support including inclined converging swinging connectors between the unit and support having their connections to the support nearer the oscillatory axis than their connections to the unit, said connectors being connected with the unit by means of pivotal rubber cushions comprising a tubular outer member, an inner member, and a rubber element bridging the space between the inner and outer members and being in non-slip relation to said members, said element being so constructed and arranged as to respond to endwise thrusts on the connectors in shear stress of the rubber and presenting an arcuate surface in the direction of thrust and a curved snubbing means having a surface opposing the arcuate end, said curved and arcuate surfaces centering in the direction of the rocking centers of the cushions and limiting the shear movement of the cushions.

6. A mounting between a unit having oscillatory vibration about an axis and a support including relatively inclined converging swinging connectors, an end of each connector having a pivotal joint having opposing flat walls with a rubber element bridging the space between the walls and secured in non-slip relation to said walls and accommodating by its distortion the pivotal movement of the joint.

7. A mounting between a unit having oscillatory vibration about an axis and a support including relatively inclined converging swinging connectors, an end of each connector having a pivotal joint having opposing flat walls with a rubber element bridging the space between the walls and accommodating by its distortion the pivotal movement of the joint, said rubber being bonded to said walls.

8. A mounting between a unit having oscillatory vibration about an axis and a support including relatively inclined converging swinging connectors, an end of each connector having a pivotal joint having a central member and two outer flat members with opposing flat walls with rubber elements bridging the spaces between the walls and secured in non-slip relation to said walls and accommodating through their distortion the pivotal movement of the joint.

9. A mounting between a unit having oscillatory vibration about an axis and a support including relatively inclined converging swinging connectors, an end of each connector having a pivotal joint having a central member and two outer flat members with opposing flat walls with rubber elements bridging the spaces between the walls and accommodating through their distortion the pivotal movement of the joint, said rubber being bonded to said walls, and means spacing the outer members.

10. A mounting between a unit having oscillatory vibration about an axis and a support including relatively inclined converging swinging connectors, an end of each connector having a pivotal joint having opposing flat walls with a rubber element bridging the space between the walls and secured in non-slip relation to said walls and accommodating by its distortion the pivotal movement of the joint, and means engaging the rubber edgewise to limit its movement.

11. A mounting between a unit having oscillatory vibration about an axis and a support including relatively inclined converging swinging connectors, an end of each connector having a pivotal joint having opposing flat walls with a rubber element bridging the space between the walls and secured in non-slip relation to said walls and accommodating by its distortion the pivotal movement of the joint, and means engaging the rubber edgewise to limit its movement, said rubber and means having opposing arcuate surfaces.

12. A mounting between a unit having oscillatory vibration about an axis and a support including relatively inclined converging swinging connectors, an end of each connector having a pivotal joint having opposing flat walls with a rubber element bridging the space between the walls and secured in non-slip relation to said walls and accommodating by its distortion the pivotal movement of the joint, and means engaging the rubber edgewise to limit its movement, said rubber and means having opposing arcuate surfaces in both load and rebound directions.

13. A swinging joint comprising relatively movable joint members spaced apart, a rubber element bridging the space between the members and secured in non-slip relation to said walls of said members and so disposed and arranged as to adapt the rubber to accommodate the swinging movement through distortion of the rubber and to respond to load thrusts in shear stress of the rubber, and means engaging the rubber to limit its shear movement, said means and rubber having opposing curved surfaces centered in the direction of the swinging center of the joint.

14. A rubber joint comprising a tubular outer member, an inner member, and rubber bridging the space between the members, said rubber having an arcuate dome-shaped end and snubbing means having a curved snubbing surface opposing the dome-shaped end of the rubber said snubbing means being normally in non-compressive relation to the major portion of the curved snubbing surface.

15. A rubber joint comprising a tubular outer member, an inner member, and rubber bridging the space between the members, said rubber having arcuate dome-shaped ends and snubbing members having curved snubbing surfaces opposing the ends of the rubber.

16. A rubber joint comprising a tubular outer member, an inner member, and rubber bridging the space between the members and positioned to receive the major portion of the load on the joint in shear, said rubber having an arcuate dome-shaped end, snubbing means having a curved snubbing surface opposing the dome-shaped end of the rubber, and means rocking the inner and outer members crosswise of their axes relatively to each other.

17. A swinging joint having opposing flat walls with a rubber element bridging the space between the walls and secured in non-slip relation to said walls and accommodating the pivotal movement by distortion of the rubber, an edge of the rubber having an arcuate surface, and means having a curved surface opposing the arcuate surface limiting the edgewise shear movement of the rubber.

18. A mounting between a unit having oscillatory vibration about an axis and a support including pairs of relatively inclined converging swinging connectors between the unit and the support, said connectors having their focal points related to the center of the oscillating mass to neutralize at least to some extent the vertical movement of the center of the mass with relation to the vertical movement of the focal point of the swinging connectors as the mass is oscillated.

19. A mounting between a unit having oscillatory vibrations about an axis and a support including relatively inclined converging swinging connectors having their connections to the support nearer the axis than their connections to the unit, and a rubber joint at the connection between the unit and each connector so constructed and arranged as to respond to endwise thrust on the connector through shear of the rubber.

20. A swinging joint having opposing flat walls with a rubber element bridging the space between the walls and accommodating pivotal movement between the opposing surfaces of the walls by distortion of the rubber, said rubber being bonded to the opposing walls, and means operating on the edge of the rubber element restraining an abnormal sidewise movement between said walls.

21. A mounting between a unit having oscillatory vibrations about an axis and a support including relatively inclined converging swinging connectors having their connections to the support nearer the axis than their connections to the unit, and a rubber mount at the connection between the unit and each connector comprising a rubber bushing having its axis endwise of the connector and so constructed and arranged as to respond to endwise thrusts on the connector through shear of the rubber.

22. A mounting between a unit having oscillatory vibrations about an axis and a support including pairs of relatively inclined converging swinging connectors, each pair having their connections to the support nearer the axis than their connections to the unit, and a rubber joint at the connection between the unit and each connector so constructed and arranged as to respond to endwise thrusts on the connector through shear of the rubber.

23. A mounting between a unit having oscillatory vibrations about an axis and a support including pairs of relatively inclined converging swinging connectors, each pair having their connections to the support nearer the axis than their connections to the unit, and a rubber joint at the connection between the unit and each connector comprising a rubber bushing having its axis endwise of the connector and so constructed and arranged as to respond to endwise thrusts on the connector through shear of the rubber.

24. A swinging joint having a rubber wall; a flat plate secured in said rubber wall in non-slip relation; the rubber wall accommodating the pivotal movement of the plate in the direction of its plane surface by its distortion, said rubber wall being provided with a snubbing surface, and said plate being provided with a snubbing shoulder adapted to engage said surface to limit the movement of the plate in the rubber.

HUGH C. LORD.